G. L. HURD.
TIRE.
APPLICATION FILED OCT. 9, 1915.
1,197,493.
Patented Sept. 5, 1916.
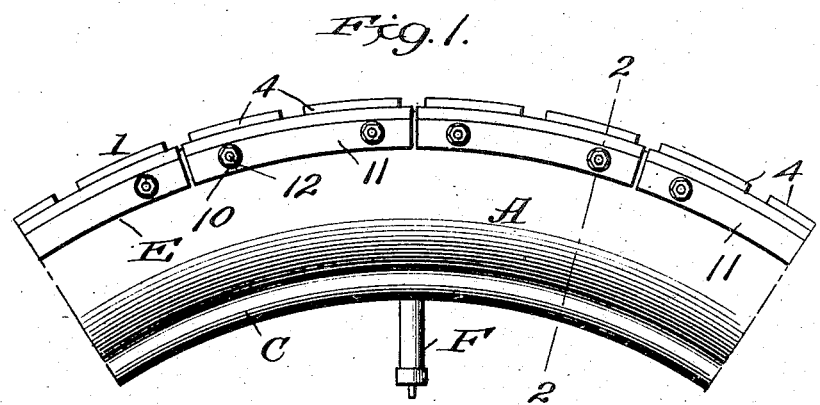
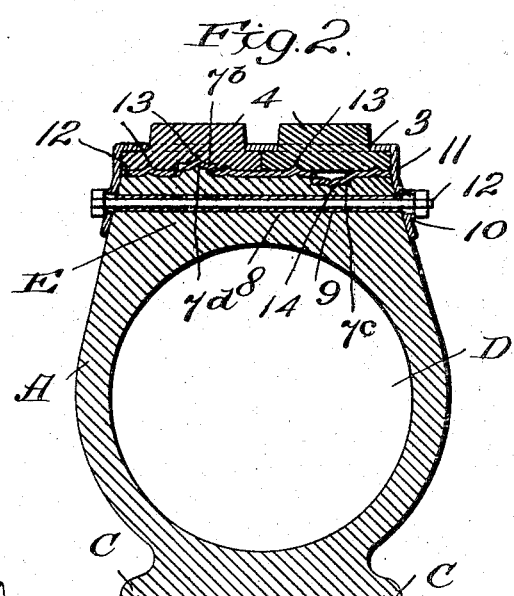
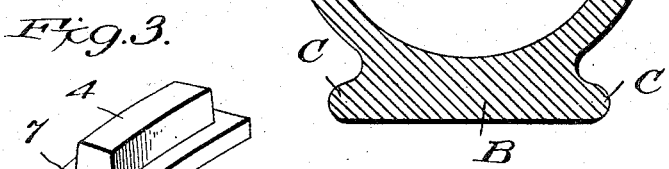
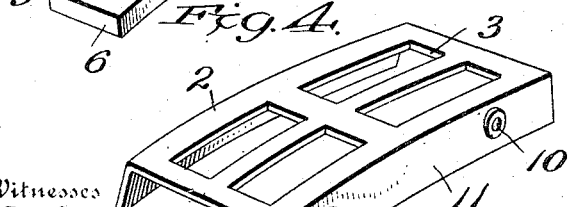
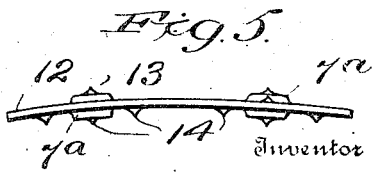
Inventor
G. L. Hurd,
By Victor J. Evans
Attorney
Witnesses
A. V. Doyle
M. E. Laughlin

UNITED STATES PATENT OFFICE.

GEORGE L. HURD, OF TENAFLY, NEW JERSEY.

TIRE.

1,197,493.

Specification of Letters Patent.

Patented Sept. 5, 1916.

Application filed October 9, 1915. Serial No. 55,023.

*To all whom it may concern:*

Be it known that I, GEORGE L. HURD, a citizen of the United States, residing at Tenafly, in the county of Bergen and State of New Jersey, have invented new and useful Improvements in Tires, of which the following is a specification.

This invention relates to tubular pneumatic tires and has for its primary object the provision of a tire of this character which will possess a high degree of buoyancy, elasticity and efficiency, and one which will be designed for the purpose of effectually taking up and absorbing the shocks and jars which are transmitted thereto.

A further object of the invention resides in the provision of means for minimizing the possibility of the tire being punctured or otherwise unduly injured by nails or other injurious foreign objects or particles which may lie in the path of the wheel.

Another object of the invention resides in the provision of a tire structure which will include a removable tread member consisting of a plurality of relatively independent metallic sections arranged in a continuous series around the tread of the shoe, and provided with cushioning blocks having portions which are presented for active yielding contact with the roadway and arranged so as to form an effective anti-slipping surface throughout the circumference of the tire.

Another object of the invention is to provide a tread member for tires having removable tread elements or blocks and means for securing said elements about the shoe of the tire so as to arrest any tendency of the same to creep around the shoe and thereby prevent undue wear and tear upon said elements and their possible dislocation from the tire.

Another object of the invention resides in the provision of a removable tread member for tires which will include apertured independent sections having cushioning blocks extending through the apertures therein and yieldable metallic plates interposed between the blocks and the shoe of the tire, and serving to obstruct the path of penetration of foreign objects which may accidentally pass into the cushioning blocks and to also serve as a means to arrest any tendency of the blocks to move circumferentially around the wheel.

Another object of the invention resides in the provision of a tire structure having tread sections which are removable at will, and means for facilitating the operation of removing the same from or applying the same to the tire.

In the drawings: Figure 1 is a side view of a portion of the tire. Fig. 2 is a section on the line 2—2 of Fig. 1. Fig. 3 is a perspective view of one of the tread blocks. Fig. 4 is a perspective view of one of the sections of the tread member. Fig. 5 is a side edge view of the yieldable retaining plate.

As stated, it is the primary object of the present invention to provide a tire structure which will be complete for the purpose of containing air under pressure, without the necessity of the common removable inner tubes. In view thereof the tire A illustrated herein is provided with a base B having flanges C—C which are adapted to be clamped to the felly of the wheel in any suitable well-known manner. The body of the tire structure is provided with a continuous air chamber D and an outer relatively enlarged portion E. A valve F is operatively connected with the tire structure at the base B thereof, and arranged so that air may be supplied to the chamber.

In order to effectually eliminate any possibility of the tire being punctured and for the further and especial purpose of eliminating undue wear upon the tire and for reducing the cost of up-keep of the tire to a minimum, provision is made of a tread device 1 consisting of a plurality of identical metallic plates or sections 2 which are each provided with a plurality of passages 3 adapted to receive therethrough the reduced extensions 4 of cushioning tread blocks 5. These blocks are formed of rubber and they are provided with continuous base flanges 6 whose surfaces 7 are adapted to come into close contact with the inner surfaces of the sections 2 as clearly shown in Fig. 2.

The sections 2 of the tread member are arranged in a continuous series around the tread of the tire body A, and they are independent of each other so that they are responsive to all of the peculiar pressures and strains which are applied to the common form of pneumatic tires. The relatively enlarged portion E of the tire A is provided with a circular series of passages 8 in which metallic sleeves 9 are mounted. Extending through the sleeves and through passages 10 in the side flanges 11 of the sections 2 of the tread member, are clamping bolts 12. Normally, the passages 10 are slightly out of alinement with the sleeves so that it will take some pressure to establish registration of the said passages 10 with the sleeve, and thereby effect a clamping action between the sections 2 and the relatively broad flat surface of the portion E of the tire body. In order to prevent the cushioning blocks 5 from creeping around the tire and for holding the blocks in the same uniform conditions at all times, provision is made of metallic plates 12 which are interposed between the outer surface of the portion E and the base or inner surfaces of the cushioning blocks. These plates are arranged between the flanges 11 of the sections 2 and they are provided with projections 13 and 14 respectively on their opposite surfaces, and on reference to Fig. 2, it is seen that the projections 13 are adapted to yieldingly embed themselves in the cushioning blocks 5, while the projections 14 are adapted to embed themselves in the portion E of the tire structure. This relation of the just mentioned parts to each other, may be effected at the time of bringing the passages 10 of the respective sections 2 into alinement with the bolt receiving sleeves 9. At any event it obviously follows, that through the provision of the plates 12 the said cushioning blocks 5 will be effectually held against creeping, and it is also desired to mention that these plates have the additional office of a guard to prevent nails or objects which may penetrate the cushioning blocks from passing into the portion E of the tire body. This is accomplished through the fact that the plates 12 are disposed in a radial line with respect to the slots 3 in the sections 2.

From the construction described it is evident that an effective tread surface is produced which will consist of elements which are capable, when worn, of being readily removed and replaced by new parts at a relatively low cost. A tire structure of high resiliency is provided in which the tread surface thereof will be absolutely puncture proof under all normal conditions, and the surface is also of a design which will minimize the possiblity of skidding of the wheel, as will be understood.
In addition to the projections 14, it is desired that further means be employed to prevent creeping of the cushioning blocks and said means is said to consist of substantially rectangular upstruck portions 7ª.
Some of these portions are seated in correspondingly shaped recesses 7ᵇ, while others are seated in similar recesses 7ᶜ in the tire body, as illustrated in Fig. 2. The cavities of the portions 7ª, which latter are received in the recesses 7ᵇ, are adapted to accommodate projections 7ᵈ on the tread surface of the tire.

What is claimed as new is:

1. A tire structure consisting of a body having a continuous annular air chamber, said body having a relatively thickened tread portion provided at spaced intervals with horizontally disposed passages, a series of metallic sections extending around the tread of said body and each provided with passages, side flanges formed on each of said sections and having apertures, cushioning elements projecting beyond said metallic sections and provided with base portions, the said metallic sections having surfaces arranged in impinging contact with said cushioning elements, plates interposed between the thickened portion of the body and the base of said cushioning elements and provided with separate groups of upstruck portions relatively extending in opposite directions whereby some of which are adapted to become embedded in the cushioning elements and the others embedded in the thickened portion of the body, and removable clamping devices adapted to be passed through the apertures in the side flanges of the metallic sections and through the horizontal passages in the thickened portion of the body and serving to operatively confine the upstruck portions of the plates against the cushioning elements and against the body.

2. A tire structure comprising a yieldable body, a series of independent metallic plates extending around the tread of said body and each having a plurality of passages, cushioning blocks extending through the passages in said metallic plates and having relatively broad base flanges, the base flanges of one block being disposed in the same horizontal line with the base flanges of the next adjacent blocks, and devices interposed between the body and the said cushioning blocks and provided with portions adapted to be yieldingly projected into said blocks and other portions adapted to be projected into the body, and means for holding said metallic plates confined against the base flanges, as and for the purpose specified.

3. A tire structure comprising a yieldable body provided with a relatively thick tread section, metallic sections independent of each other and extending around the tread section of the body, removable cushioning blocks between said metallic sections and the body, said blocks having reduced portions extending through and disposed beyond said metallic sections and having relatively broad base flanges located under said metallic sections, and a continuous series of relatively free plates interposed between the tread section of the body and the cushioning blocks and having upstruck portions certain of which are adapted to be embedded in the blocks and the other of said portions adapted to be embedded in the body, and means for holding the metallic sections under pressure against the flanges of the blocks and for in turn effecting impingement of the mentioned upstruck portions respectively against the blocks and said body.

4. A tire structure comprising, in combination with an elastic body, a continuous annular series of relatively free metallic protecting plates extending around the tread of the body, an annular series of plates located outwardly of the first plates, cushioning blocks having portions passing through the second plates and having horizontally alined base flanges in contact with the first plates, and means for preventing the creeping of the blocks around said body and comprising portions upstruck from the first plates, second portions upstruck from said first plates for preventing any circumferential movement thereof, and removable means adapted to be passed through the tread portion of the body and through the second plates and serving to hold the latter under pressure against the blocks and in turn, forces the mentioned upstruck portions of the first plates into the blocks and into the body.

In testimony whereof I affix my signature in presence of two witnesses.

GEORGE L. HURD.

Witnesses:
M. E. LAUGHLIN,
GEO. A. BYRNE.

Copies of this patent may be obtained for five cents each, by addressing the "Commissioner of Patents, Washington, D. C."